Sept. 15, 1959 W. L. KONRAD 2,904,753
SERVO RATIOMETER HAVING AUTOMATIC PHASE SELECTION
Filed April 6, 1955 2 Sheets-Sheet 2

INVENTOR.
William L. Konrad
BY
W. L. Stout
HIS ATTORNEY

United States Patent Office 2,904,753
Patented Sept. 15, 1959

2,904,753

SERVO RATIOMETER HAVING AUTOMATIC PHASE SELECTION

William L. Konrad, Pittsburgh, Pa., assignor to Westinghouse Air Brake Company, Wilmerding, Pa., a corporation of Pennsylvania Application April 6, 1955, Serial No. 499,637

8 Claims. (Cl. 324—99)

This invention relates to apparatus for measuring and indicating electrical values, and particularly to apparatus for measuring an alternating electrical voltage and presenting such a voltage in the form of its ratio to a reference voltage.

In testing and servicing complex modern electronic systems, it is frequently necessary to make voltage measurements at a number of points in the system. Since the absolute values of such voltages depend to some extent on the line voltage, which is subject to fluctuations, conventional volt meters have been found unsatisfactory for this purpose. Accordingly, it is an object of this invention to provide a voltage measuring instrument in which the voltage to be measured will be presented as a ratio to that line voltage, whereby line voltage fluctuations will be compensated.

It is a further object of this invention to provide a servo mechanism which divides a voltage at a point to be tested by a reference voltage and indicates this ratio on a dial mechanically linked to the servo mechanism shaft.

Since the voltage at a given test point is not necessarily in phase with the line voltage, it is a further object of this invention to provide a servo ratiometer in which the voltage to be measured and the line voltage are automatically connected to a ratio measuring circuit in phase opposition.

It is a further object of the invention to provide a servo ratiometer having a comparing circuit in which the test voltage is automatically connected in the proper sequence to the line voltage and in which the ratio of the test voltage to the line voltage is indicated on a suitable dial affixed to the instrument.

It is a further particular object of the invention to provide a servo ratiometer in which the servo motor is not energized except when a test voltage input is present.

Other objects and further advantages of the invention will be apparent to those skilled in the art as the disclosure proceeds.

I shall describe two forms of servo ratiometers embodying my invention, and shall then point out the novel features thereof in claims.

Figure 1:
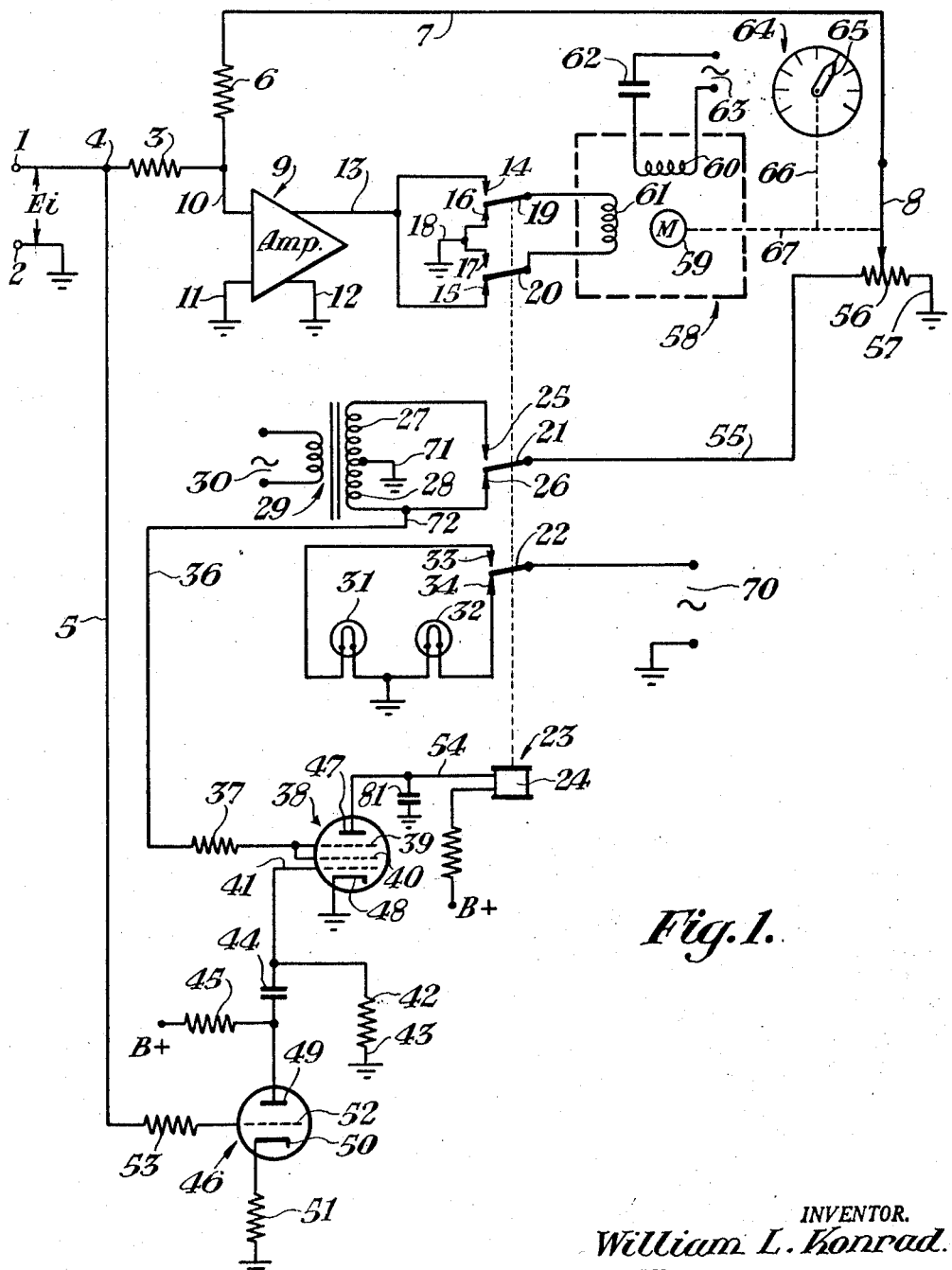
Fig. 1 is a schematic wiring diagram of one embodiment of the invention.

As shown in Fig. 1, the voltage E$i$ to be measured is applied across input terminals 1 and 2 and thence across summing resistor 3 to input terminal 10 of a conventional phase discriminating servo amplifier 9. The input and output of amplifier 9 are grouned at 11 and 12, respectively, as shown. Output terminal 13 of amplifier 9 is connected to relay contacts 14 and 15, and depending on the position of relay 23, terminal 13 of amplifier 9 is then connected to one or the other side of motor winding 61 through switch arm 19 or 20. The other side of motor winding 61 is grounded through contact 16 or 17 as indicated at 18. The other winding 60 of motor 58 is connected to a suitable source of alternating current 63 through phasing capacitor 62 in a conventional manner. Motor 58 is a conventional two-phase induction servo motor and need not be further described.

Rotor 59 of motor 58 drives a follow-up signal generator, comprising potentiometer wiper 8 and resistor 56, through a mechanical connection indicated at 67, which may include a conventional clutch and reduction gear if desired. The magnitude of the voltage developed between the wiper and ground is therefore proportional to the extent of motor operation. Wiper 8 is connected by lead 7 to one end of summing resistor 6 which is connected to terminal 10 of amplifier 9 to form a second input in the amplifier. Wiper 8 moves over resistance 56 which is grounded at one end at 57 and connected at the other end through lead 55 to switch arm 21. Switch arm 21 engages either contact 25 or contact 26 depending upon the position of relay 23 and is thereby energized from a suitable source of alternating voltage, as indicated schematically at 30, with a phase depending upon the position of the relay. The source may be of any conventional kind, but as here shown includes a transformer 29 center-tapped at 71 having a winding 27 of one phase and a winding 28 to provide an opposite phase which may be energized by a suitable winding from source 30, excited at the same frequency as the voltage E$i$ under test.

Relay 23 is energized by means to be hereinafter described in such a manner as to connect either side 27 or side 28 of transformer 29 to potentiometer 56 so that the output at wiper 8 will be in phase opposition to the test voltage E$i$. Accordingly, amplifier 9 is supplied with an input equal to the algebraic sum of voltage E$i$ and the voltage developed across potentiometer 56 by the movement of wiper 8. Motor 58 will then operate until wiper 8 has assumed a position on potentiometer 56 such that the inputs across summing resistors 3 and 6 are equal and opposite. Amplifier 9 will then be balanced and motor 58 will stop.

In addition to its mechanical connection 67 to wiper 8, motor 58 is also connected to drive needle 65 of indicator 64 by a mechanical connection indicated schematically at 66. The dial indicator 64 is graduated in terms of the ratio of the input voltage to the reference voltage.

Phase responsive means are provided to operate relay 23 in accordance with the relationship between the phase of the input voltage E$i$ and the source of reference voltage input at 30. As shown, grid 52 of tube 46 is connected through resistor 53 and lead 5 to terminal 4, which is connected to input terminal 1. Tube 46 may be a conventional triode having a cathode 50 grounded through resistor 51 and a plate 49 supplied with potential from a suitable source of D.C. potential through resistor 45. Plate 49 is coupled through condenser 44 to grid 41 of an electron discharge device here shown as a pentode 38. Pentode 38 is of conventional construction, having a grounded cathode 48 and a suppressor grid 39 externally connected to screen grid 40. Plate 47 is connected to coil 24 of relay 23 and to a suitable filter condenser 81 by means of lead 54.

As a result of the phase inversion in tube 46, an alternating voltage of a frequency equal to and 180° out of phase with the input voltage E$i$ is supplied to the grid of tube 38. Screen 40 and suppressor 39 are connected through resistor 37, lead 36 and terminal 72 to one side of a suitable alternating voltage source such as, for example, transformer 29 as shown.

The arrangement is such that when the reference voltage at 72 is in phase with input voltage E$i$, the grid and screen voltages of tube 38 will be out of phase and tube 38 will not conduct. However, when the voltage at 72 is 180° out of phase with the test voltage E$i$, the screen and grid voltages in tube 38 will be in phase and tube 38 will conduct and energize relay 23. The tube will also conduct if no test input voltage is present, due to the reference voltage input to the screen grid. Contact arms 19, 20, 21 and 22 of the relay will then be actuated to make the proper amplifier connections to the motor and source connections to the potentiometer. Arm 22 is provided to select contact 33 or 34 and to energize indicator light 31 or 32 from source 70 in order to indicate to the operator the condition of operation of the apparatus and the relative phase of the test and reference voltages.

In operation, source 30 terminals are connected to a suitable supply which usually will be the line voltage supplied to the apparatus under test. Terminals 1 and 2 are then connected to the apparatus at the points to be tested.

Assuming that the relay is in the position shown, the test input across summing resistor 3 unbalances amplifier 9, causing motor 58 to operate and move wiper 8 on potentiometer 56. The voltage developed across potentiometer 56 is applied to the input of the amplifier through summing resistor 6, and when this voltage is equal in magnitude, though opposite in phase, to that developed across resistor 3, the amplifier will again be balanced and the motor will stop. The position of dial 65 on indicator 64 then directly and immediately indicates the ratio of the input voltage E$i$ to the reference voltage supplied at 30.

Should the input voltage initially not be in proper phase relation to source 30, the previously described operation of tubes 46 and 38 will occur, energizing relay 23 to reverse the contacts on the terminals of motor coil 61 and potentiometer 56 to secure the desired phase relationship.

Which of indicator lights 31 and 32 is lighted will indicate to the operator whether or not the relay has been operated, and the relative phase of the test and reference voltages.

Figure 2:
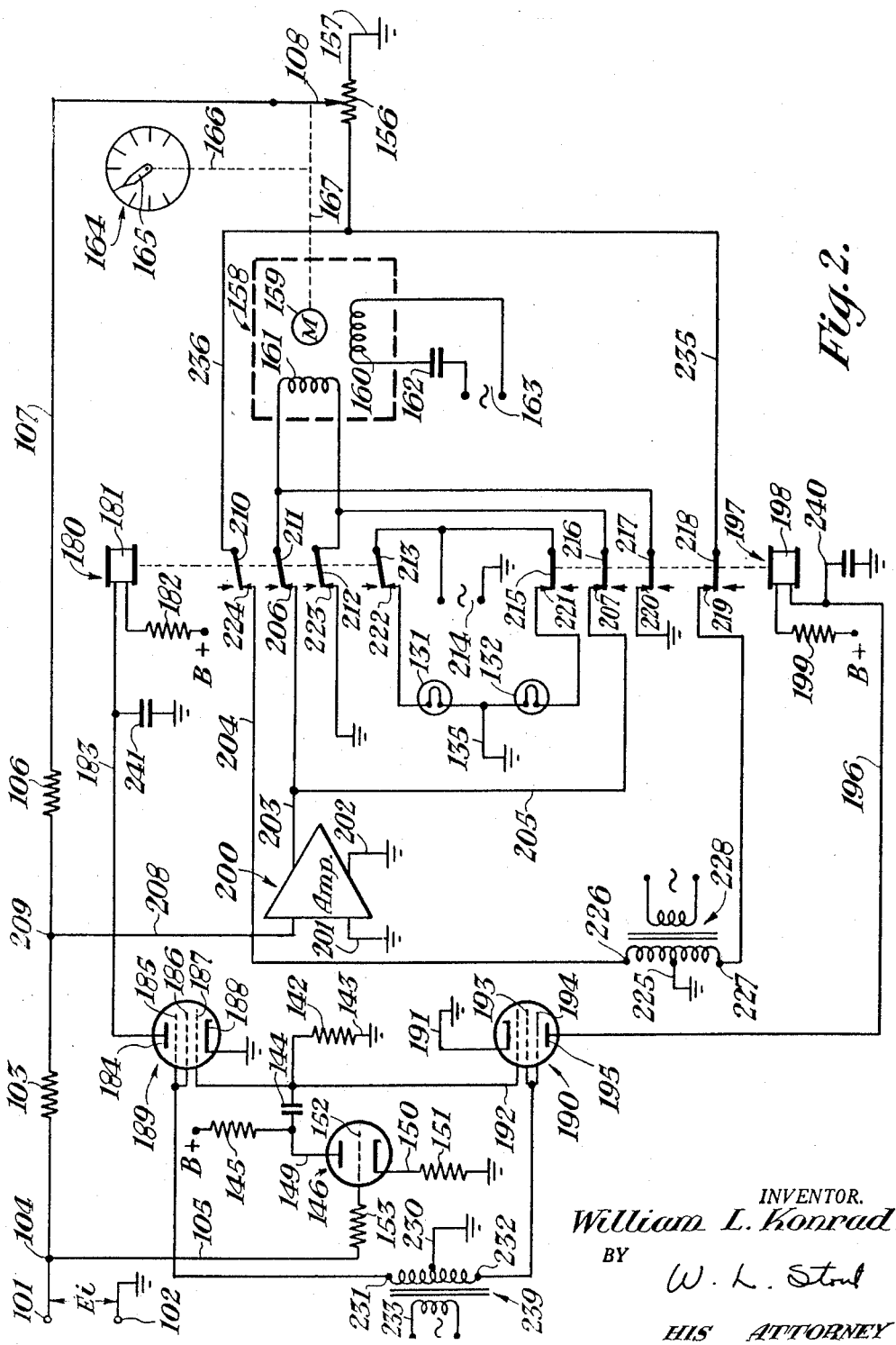
Fig. 2 is a schematic wiring diagram of a second embodiment of the invention.

Fig. 2 shows a second embodiment of the invention in which the servomotor is prevented from operating unless an actual input is applied across the test terminals.

In this figure the test voltage E$i$ is applied across input terminals 101 and 102. Amplifier 200, corresponding to amplifier 9 in the previous embodiment, has an input terminal 201 which is grounded and a second input terminal 208 which is connected through terminal 209 and summing resistor 103 to input terminal 101. Motor 158, corresponding to motor 58 in the previous embodiment, is energized by amplifier 200 in a manner depending on the energization of relays 180 and 197 to be hereinafter described. Motor 158 operates an indicator 164, through mechanical connection 166, and a wiper 108 of a follow-up signal generator comprising potentiometer 156 which corresponds to potentiometer 56 in the preceding embodiment, through a mechanical connection 167 which may include a suitable clutch and reduction gearing. The voltage developed across potentiometer 156 is fed from wiper 108 through lead 107 and summing resistor 106 to summing point 209 and thence to amplifier 200 by means of input terminal 208.

The system operates similarly to the previously described embodiment, such that the servomotor will run until a voltage equal in magnitude but opposite in phase to that applied at the input terminals is developed across potentiometer 156. The amplifier will then be balanced and the motor will stop. Needle 165 on indicator 164 will then show directly the value of the ratio of the input voltage to the reference voltage.

The reference voltage may be applied to a winding indicated schematically at 228 and thence to a winding center-tapped at 225 and having terminals 226 and 227 which supply a voltage of one or an opposite phase to a terminal of potentiometer 156 through back contact 224 or 219 and switch arms 210 or 218 depending upon the condition of relays 180 and 197 to be hereinafter described.

Indicator lights 131 and 132 are provided as in the previous embodiment to indicate the state of the relays and the relative phase of the test and reference voltages.

In order to secure the proper phase connections to motor 158 and to potentiometer 156, relays 180 and 197 are provided. These relays are energized through leads 183 and 196 respectively from plates 184 and 195 of pentodes 189 and 190. Suitable filter condensers 241 and 240 are provided to smooth the tube outputs. The pentodes are of conventional construction and may correspond in structure to tube 38 in the previous embodiment. As in Fig. 1, the suppressor and screen grids are connected together, and are so connected to a source of reference voltage, as indicated schematically by transformer 239, that screen 186 of tube 189 has a reference voltage on one phase applied to it and screen 193 of tube 190 has a reference voltage of the same magnitude but of opposite phase applied to it. Grids 187 and 192 of tubes 189 and 190, respectively, are connected together and are coupled from capacitor 144 to plate 149 of tube 146. Grid 152 of tube 146 is connected through resistor 153, lead 105, and terminal 104 to input terminal 101. The switching apparatus of this embodiment operates as in the preceding embodiment to provide the proper phase sequence in motor 158 and potentiometer 156. Tubes 189 and 190 will conduct if no input signal is present, due to the reference signal applied to the screens of these tubes. Therefore, both relays 180 and 197 will be normally energized. However, since the motor and amplifier connections are made through the back contacts of relays 180 and 197, the presence of an input test voltage, which acts to cut off one of tubes 189 and 190 and to drop out one of relays 180 and 197, is a necessary condition for the operation of the motor. Therefore, servomotor 158 will not be operated unless the apparatus is actually in use.

The operation of this embodiment of the invention is as follows: source inputs 228 and 239 are connected to a suitable supply, which may be the line supply to the equipment under test. Assuming that this line voltage is 180° out of phase with the input voltage E$i$, due to the phase inversion in tube 146, grid 187 of tube 189 will be 180° out of phase with screen 186. Accordingly, tube 189 will not conduct. Since screen 193 of tube 190 is connected to the opposite end of transformer 239, its screen voltage will be in phase with the grid voltage at 192 and accordingly tube 190 will conduct and will energize relay 197. Switch arms 210, 211, 212 and 213 will then be moved into engagement with their respective back contacts 224, 206, 223 and 222. Output terminal 203 of amplifier 200 will then be connected through back contact 206 and arm 211 to coil 161 of motor 158. The opposite side of coil 161 will then be connected through switch arm 212, contact 223 and ground. Potentiometer 156 is grounded at 157 and will be connected at the other end from lead 236, switch arm 210, contact 224, lead 204, coil terminal 226 and ground at 225 in transformer 228. Indicator light 131 will be energized from source 214 through back contact 222 and arm 213 of relay 180. Due to the voltage developed across summing resistor 103 by test input voltage E$i$, the amplifier will be unbalanced and motor 158 will be operated to drive wiper 108 across potentiometer 156 until a voltage equal and opposite to the input is developed across summing resistor 106, whereafter the amplifier will be balanced and the motor will stop. Needle 165 will then indicate the proper ratio of the input voltage to the reference voltage.

While, as stated, in ordinary use, the source inputs such as 228 and 239 in Fig. 2 and 30 in Fig. 1 will be connected to the line voltage of the equipment under test, it is further possible to employ the apparatus of either embodiment to measure the ratio of two unknown voltages by connecting one of such voltages to input terminals 1 and 2 in Fig. 1 or 101 and 102 in Fig. 2 while the second voltage under test is connected to the indicated source terminal 30 in Fig. 1 or 228 and 239 in Fig. 2. Further, the center-tapped transformers shown are merely illustrative and the reference or test voltages in question may be connected directly to the output terminals shown for these transformers.

While I have shown certain embodiments of my invention in detail, it should be understood that these embodiments are merely illustrative of the forms which my invention may take, and many modifications will be apparent to those skilled in the art. Accordingly, I do not wish to be limited by the details shown but only by the scope of the following claims.

Having thus described my invention, what I claim is:

1. Apparatus of the class described, comprising, in combination, a servomotor having an indicator connected thereto, control means for said servomotor, first connecting means for reversibly connecting said control means to said servomotor, an adjustable signal generator driven by said servomotor, means connecting said signal generator to said control means, a source of alternating potential for said signal generator, second connecting means for reversibly connecting said source to said signal generator, means for supplying an alternating signal voltage of the frequency of said source to said control means, means responsive to the phase of said signal voltage with respect to the phase of said source, and means operated by said last named means for actuating both said connecting means to connect said servomotor to said control means and said signal generator to said source in a sequence such that the signal generator is driven by the motor to provide an input to the control means opposing the signal voltage.

2. In voltage measuring apparatus, a summing circuit having a pair of input terminals and an output terminal, means for connecting one of said input terminals to a source of alternating voltage to be measured, servomotor control means connected to the output terminal of said summing circuit, a servomotor, connecting means for reversibly connecting said servomotor control means to said servomotor, an adjustable signal generator connected to said servomotor, said signal generator having an output connected to the other of said input terminals, a reference source of alternating voltage of the frequency of said voltage to be measured adapted to be reversibly connected to said signal generator, means responsive to the phase of said reference source with respect to said voltage to be measured for simultaneously connecting said source to said signal generator and operating said connecting means, whereby the signal generator will develop a potential equal and opposite to said voltage to be measured, and an indicator driven by said servomotor.

3. A voltage ratio measuring device, comprising, in combination, a servomotor, an indicator driven by said servomotor, control means for said servomotor, means for supplying a voltage to be measured as an input to said control means, follow-up means driven by said servomotor for developing a voltage of the frequency of the measured voltage and of a magnitude depending on the extent of motor operation, a reference source of voltage for said follow-up means, means for supplying said developed voltage to said control means, and means responsive to the relative phase of said measured and reference voltages to connect said control means to said servomotor and said source to said follow up means in a phase relationship such that the voltage developed by the follow-up means is always in phase opposition to the voltage to be measured.

4. A ratio measuring device, comprising, in combination, a servo amplifier having input and output portions and adapted to have a first alternating voltage of a predetermined frequency applied to its input portion, a servomotor adapted to be connected to the output portion of said amplifier, ratio indicating means driven by said servomotor, a potentiometer having a wiper driven by said servomotor and a winding adapted to be energized by a reference source of alternating voltage of said predetermined frequency, means connecting the wiper of said potentiometer to the input portion of said servo amplifier to supply to said amplifier said reference voltage in opposition to said first voltage, means responsive to the relative phase of said first and reference voltages, first means actuated by said phase responsive means when said first and reference voltages are in phase for connecting said servomotor to said amplifier and said potentiometer to said reference source in one manner, and second means actuated by said phase responsive means when said first and reference voltages are in phase opposition for connecting said servomotor to said amplifier and said potentiometer to said reference source in a reverse manner.

5. A servo ratiometer comprising a servomotor having a control winding, an amplifier for said servomotor having output terminals affixed thereto, a potentiometer driven by said servomotor and having an output terminal and a pair of input terminals, adapted to have a source of alternating voltage of fixed frequency attached thereto, summing means for connecting the output terminal of said potentiometer to said amplifier, input means for applying an alternating voltage of said fixed frequency to said summing means, a pair of electron discharge devices each having two control electrodes and an output circuit, means connecting one of the control electrodes of each discharge device to said input means, means for connecting the other control electrode of one of said discharge devices to one terminal of said source of voltage of fixed frequency, means for connecting the other control electrode of the second of said discharge devices to the other terminal of said source of voltage, a relay in the output circuit of each discharge device, contacts controlled by one of said relays to connect said amplifier output terminals to said servomotor winding in one manner and to connect said potentiometer input terminals to said source in one manner, contacts controlled by the other of said relays to connect said amplifier output terminals to said servomotor winding in a reverse manner and to connect said potentiometer terminals to said source in a reverse manner, and a ratio indicator operated by said servomotor for indicating the ratio of said voltages applied to said summing means.

6. The apparatus of claim 5, in which means are provided for indicating the phase relationship between said voltages applied to said summing means.

7. A servo ratiometer, comprising a servomotor having a control winding, an amplifier for said servomotor having an input summing circuit and a first set of output terminals normally connected to the control winding of said servomotor in one manner, a potentiometer adjusted by said servomotor and normally connected to a first source of alternating voltage of predetermined frequency in one manner, said potentiometer having an output terminal connected to the input summing circuit of said amplifier, a second set of terminals for connecting a second alternating voltage source of said fixed frequency to the input summing circuit of said amplifier, an electron discharge device having a control electrode responsive to the voltage supplied by said second set of terminals, a second control electrode for said discharge device responsive to the voltage supplied by said first source, an output circuit for said discharge device, relay means in said output circuit, said relay means having contacts for reversing the connections of said amplifier to said motor winding and said potentiometer to said first source upon actuation of said relay means, and a ratio indicator actuated by said servomotor and graduated to indicate the ratio of the voltage magnitudes of said first and second voltage sources.

8. Apparatus according to claim 7, including in addition means for indicating the phase relationship of said first and second voltage sources.

(References on following page)

References Cited in the file of this patent

UNITED STATES PATENTS

| | | |
|---|---|---|
| 2,497,961 | Shaw | Feb. 21, 1950 |
| 2,528,486 | Dannatt et al. | Nov. 7, 1950 |
| 2,679,630 | Felch | May 25, 1954 |
| 2,694,143 | Chambers | Nov. 9, 1954 |

OTHER REFERENCES

Korn et al.: "Electronic Analog Computers," 1952, McGraw-Hill Book Co., Inc., N.Y., page 235. Copies in Div. 69 and Scientific Library.